Dec. 15, 1964
A. HOROWITZ
3,161,240
AGRICULTURAL IMPLEMENT PROVIDED
WITH AN OVERLOAD PROTECTION
Filed Oct. 23, 1962
5 Sheets-Sheet 1
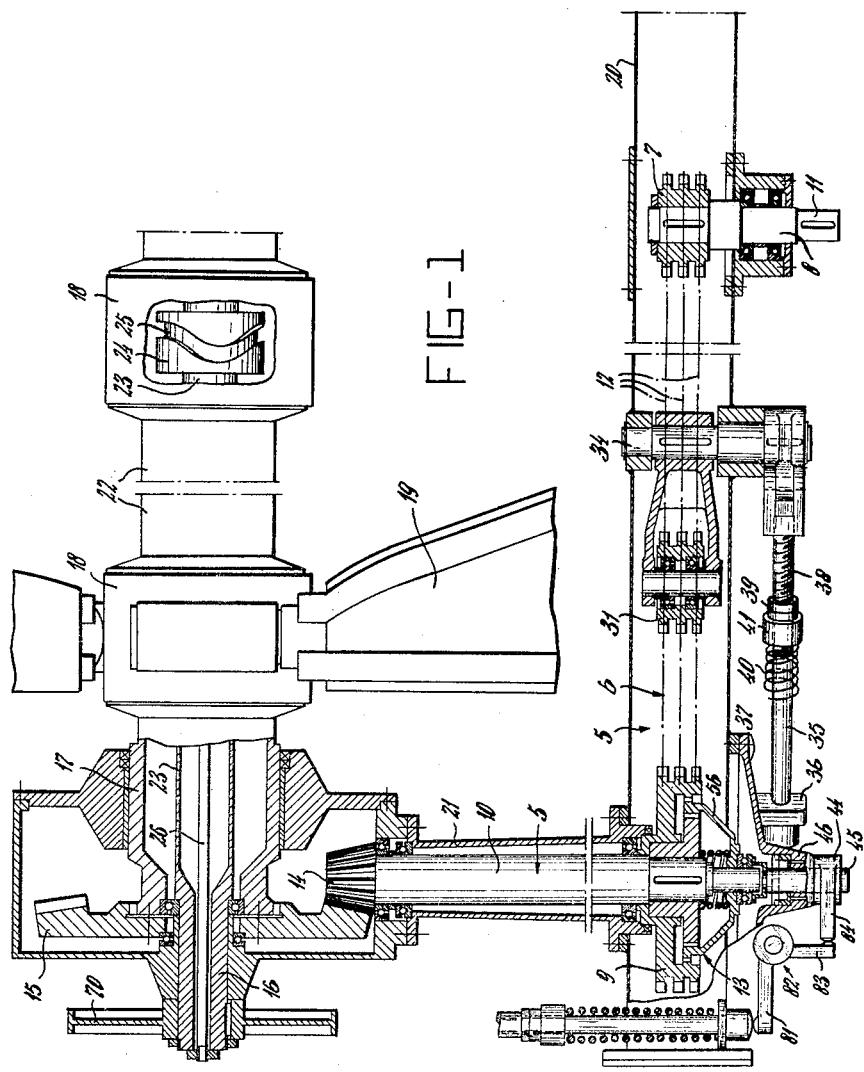
INVENTOR.
ALEXANDRE HOROWITZ
BY
ATTORNEYS

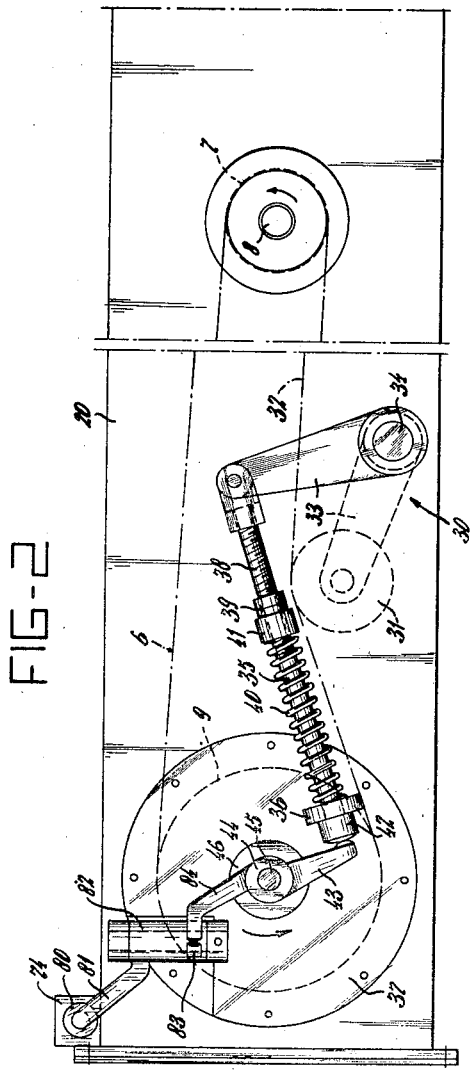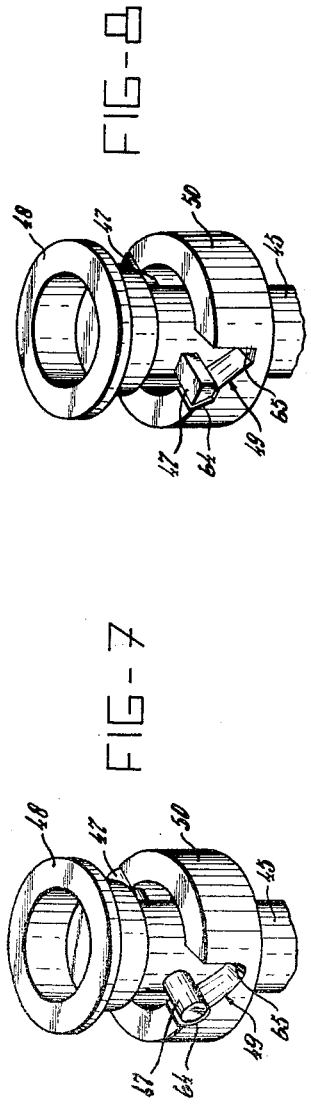

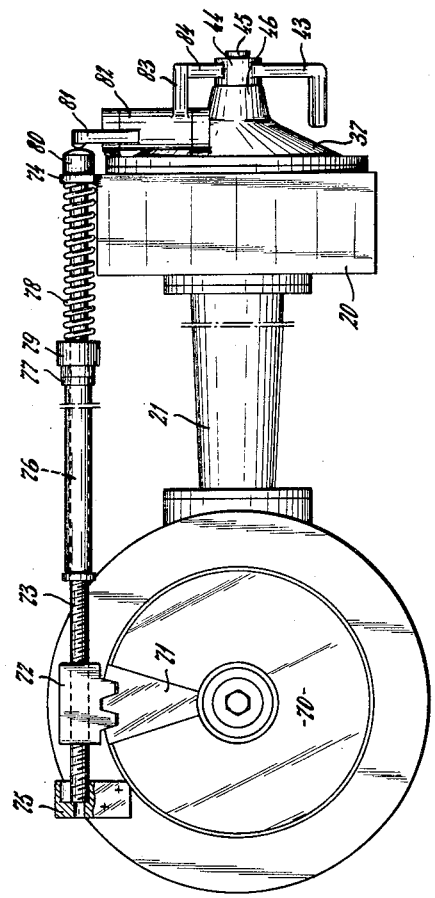

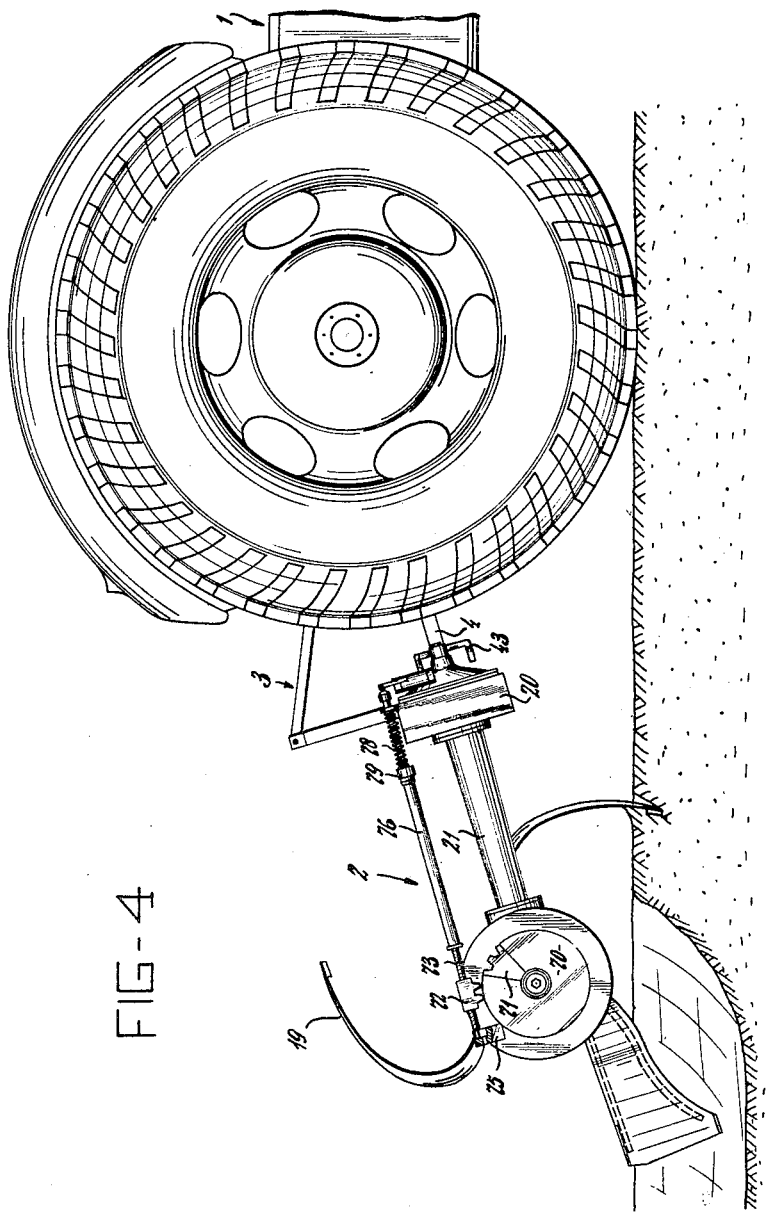

Dec. 15, 1964    A. HOROWITZ    3,161,240
AGRICULTURAL IMPLEMENT PROVIDED
WITH AN OVERLOAD PROTECTION
Filed Oct. 23, 1962    5 Sheets-Sheet 5

INVENTOR.
ALEXANDRE HOROWITZ
BY *Trinne and Finley*
ATTORNEYS

United States Patent Office 3,161,240
Patented Dec. 15, 1964

3,161,240
AGRICULTURAL IMPLEMENT PROVIDED WITH AN OVERLOAD PROTECTION
Alexandre Horowitz, Eindhoven, Netherlands, assignor to Herbert Vissers, Spoorstraat, Nieuw, Vennep, Netherlands
Filed Oct. 23, 1962, Ser. No. 232,358
13 Claims. (Cl. 172—103)

My invention relates to an agricultural implement, in particular a digging machine or a furrow or trench digger, comprising a number of digging elements which are disposed in an annular configuration around a common axis of rotation, the implement being provided with a tractor, which is equipped with a branch shaft, driving the implement by way of a mechanism, the device further comprising an impulse sending element, which on the one hand is under the action of a spring and on the other hand is under the influence of the driving force, and a disconnectable coupling means, which is positioned in series in the driving mechanism and which can be disconnected by the impulse sender.

In most cases the coupling in such like installations is in the vicinity of the driving engine of the tractor and the impulse sender forms a part of the branch shaft or cooperates therewith. In a rather voluminous agricultural implement it may happen that when an overload is occurring in a definite part of the mechanism there is lost too much time until this overload has propagated to that part (e.g. the branch shaft) with which cooperates the impulse sender. This could give rise to a lasting deformation or even a rupture in the former part of the driving mechanism before the coupling is switched off.

It is an object of my invention to obviate this disadvantage by providing at least one impulse sending element at the end of the driving mechanism and in the vicinity of the common axis of rotation of the digging elements. The impulse can be transmitted hydraulically, electrically or mechanically to the coupling means (for instance by means of a Bowden cable). The impulse will consequently be derived from the most exposed point of the implement and is transmitted without delay to the coupling means, thus avoiding any damage due to overload.

A further object of my invention consists in providing two impulse sending elements cooperating with the disconnectable coupling, each element being at one end of the driving mechanism, that is to say one in the proximity of the branch shaft and the other near to the digging elements. In this way there is obtained a guarantee against any overload which may be produced when the implement is in operation.

As great driving forces can be produced in agricultural implements it is a further object of my invention to effect the actuation of the overload protection at a very exact and previously adjustable value of the driving force, the disconnecting or uncoupling force being simultaneously held as small as possible.

Another object of my invention is to prevent the coupling means from being influenced by changes in the driving force which are less than a preselected value. If, however, this value is exceeded then at least one of the impulse senders operates to disconnect the coupling means.

A still further object of my invention is to obtain a compact and solid construction of the disconnectable coupling means.

Another object of my invention is to intensify the disconnecting movement of the disconnectable coupling by deriving same also from the driving couple.

My invention relates more in particular to an agricultural implement, composed of digging units mounted on a common hollow shaft, each unit consisting of a number of tiltable digging blades, the said shaft being rotated by a driving mechanism, while the implement further contains a central shaft, supported within the said hollow shaft, and on which are provided cam profiles, with which a tilting mechanism disposed within each digging unit cooperates, while in a direction perpendicular to the central shaft there is secured thereto a projection engaging and an adjustable rod connected with the frame of the implement for blocking the said central shaft in a definite relative angular position, as described in my copending application Serial Number 754,857 (now Patent 3,012,616). The greater part of the driving force is hereby transferred to the shovel blades by way of the common hollow shaft for performing the digging operation. Periodically a smaller part of the driving force is used in order to tilt a shovel blade. When now owing to a disturbance the tilting over movement is hampered, then the force in the tilting mechanism will increase, whereby parts of this mechanism can be deformed or may even break down. The reaction force of this overload will be exerted on the cam profile, disposed on the central shaft. It is an object of my invention to eliminate the overload in this tilting mechanism, and to use said adjustable rod as an impulse sender for the disconnectable coupling.

The possibility exists, however, that for instance owing to the mass inertia, the agricultural implement still moves on over a small distance in spite of the disconnection of the drive of the digging device. As the shovel blades grab into the ground the rotation of the shovel blades can continue and in the event of the tilting over movement being blocked this could still result in a deformation of the tilting mechanism. My invention also aims to avoid this possibility.

Another object of my invention is to be able to restore automatically the correct relative angular position of the cam profiles in respect of the tilting mechanism.

Other and further objects and advantages of my invention will become apparent from the following description, taken in conjunction with the accompanying drawings, in which:

FIGURE 1 shows a plan view of a part of an agricultural implement, which is provided with a driving mechanism, various parts thereof being cut out.

FIG. 2 is a front view of the implement according to FIG. 1.

FIG. 3 is a side elevation of the implement according to FIG. 1, the mechanism being in the engaged position.

FIG. 4 is a side elevation of the agricultural implement according to FIG. 1 but to a smaller scale than represented in the preceding figures, the overload coupling having been actuated.

Figure 5:
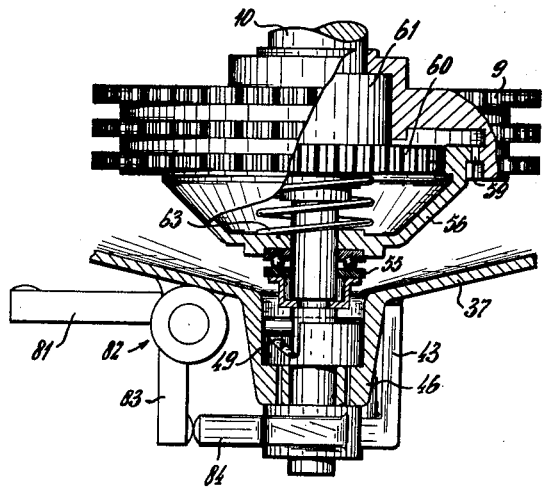
Figure 6:
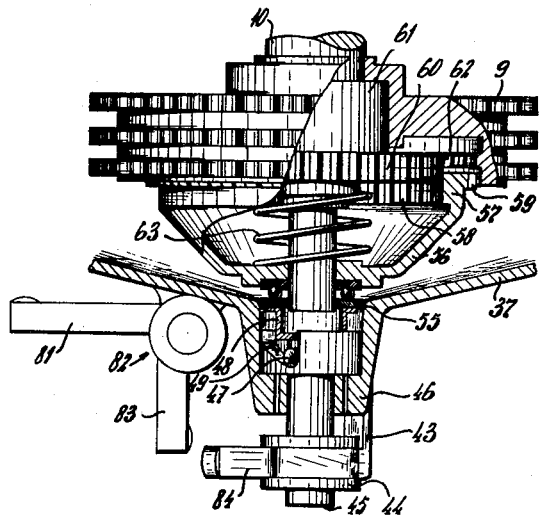

The FIGURES 5 and 6 show to an enlarged scale a part of the driving mechanism, the overload coupling being in the engaged and disconnected position, respectively.

FIGURE 7 gives a perspective view of the locking element of the driving mechanism.

FIGURE 8 is a modification of the element according to FIGURE 7.

The agricultural implement with reference to which the construction and the operation of the overload mechanism according to the invention will be clarified is in practice denominated a "digging machine," and is described in an earlier embodiment by the British patent specification 885,938. As appears from FIG. 4 the rear side of a (partially represented) tractor 1 supports a digging implement 2 by means of a hydraulic lifting mechanism 3. The lifting mechanism 3 determines the position of the digging implement 2 with respect to the ground to be operated on. A branch shaft 4 is led from the tractor 1 to the driving mechanism 5 (see FIG. 1), forming a part of the digging implement 2.

As is obvious from FIG. 1 the driving mechanism 5 consists of a chain transmission 6 constituted by a sprocket wheel 7 on a shaft 8 and a sprocket wheel 9 on a shaft 10. The shaft 8 on its free protruding end 11 is provided with means for coupling the branch shaft visible in FIG. 4. The connection between the sprocket wheels 7 and 9 is constituted by a threefold chain 12. The sprocket wheel 7 is secured on the shaft 8 and the sprocket wheel 9 is connected with the one end of the shaft 10 by way of a coupling 13 to be described hereinafter. The other end of the shaft 10 is provided with a bevel gear wheel 14, which engages a crown wheel 15, which is mounted for free rotation about a central shaft, 16. The wheel 15 is secured to a hollow shaft 17 which is integral with the housings 18 in which the tilting mechanism, described in the British patent specification 885,938 is accommodated. The latter mechanism serves to tilt at the right moment digging elements 19 with which the digging operation is performed (see FIG. 4). The entire driving mechanism is accommodated in a casing which consists of a boxlike housing 20 for the chain transmission, a tube shaped housing 21 for the shaft 10 and a composite casing for the end portion of the driving mechanism. This composite casing consists of substantially cylindrical housings 18 with intermediate tube pieces 22 which along the adjacent faces are connected with each other. The central shaft 16 is constructed from a number of tube pieces 23 with interposed rings 24, provided with a cam profile 25. This aggregate is held together by a pull rod 26. Co-operating with each cam profile 25 are always as many followers or rollers (not shown) as there are digging elements 19.

The first disconnecting mechanism according to FIG. 2 is formed by an impulse sending element 30 constructed as a roller 31, which cooperates with the driving run 32 of the chain 12. The roller 31 is supported by a bell crank lever 33, which hinges about a shaft 34 supported in the housing 20. Connected with the other end of the bell crank lever 33 is a rod 35, which by its free end is slidingly guided in a support 36, secured on a cover 37, which is removably connected with the housing 20. The rod 35 is threaded 38 on a part thereof on which are disposed two nuts 39. Around the rod is a helical spring 40 which by its one end is bearing against the bracket 36 and by its other end is bearing against a pressure piece 41, bearing on the nuts 39. At its free end the rod 35 has a head 42 which can abut against the support 36 and on the other side is capable of cooperation with an arm 43. By screwing on the nuts 39 the compression of the spring 40 is regulated. Hereby the force is adjusted with which the roller 31 presses against the run 32 of the chain drive 6. When the force to be transmitted by the chain drive 6 exceeds a definite value, the straightening force of the angularly bent run 32 will exceed the compression force of the roller 31 whereby this roller will be displaced and the rod 35 is moved against the action of the spring 40 by way of the bell crank lever 33, so that the head 42 will move the arm 43 for a purpose to be described hereinafter.

As is visible in the FIGURES 1, 2, 5 and 6 the arm 43 is by means of a hub 44 secured to a shaft 45, which is in line with the shaft 10. The shaft 45 is freely rotatably and slidingly supported in the protruding central portion 46 of the cover 37 and in the proximity of its end the said shaft carries a pin 47, extending in cross direction, and also a cup shaped pressure element 48. The free ends of the pin 47 cooperate with a cam surface 49 machined in a ring 50, which is secured in the interior of the portion 46. The cooperation between the pin 47 and both identical cam surfaces 49 determines the position of the shaft 45 as well in axial as in tangential direction.

Bearing against the cup shaped element 48 by way of a collar thrust bearing is a saucer 56. This saucer 56 forms a part of the coupling 13 between the sprocket wheel 9 and the shaft 10. This coupling comprises an axially slidable member, consisting of the saucer 56 which at its broadened end carries a ring 57, said ring having an inner row of claws 58 and an outer row of claws 59. The row 58 can cooperate with a complementary row of claws 60 disposed on an intermediate element or hub 61, which is secured on the shaft, 10. The row 59 cooperates with a complementary row of claws 62, provided along the inner side of a cavity in the sprocket wheel 9. Mounted between the hub 61 and the inner side of the saucer 56 is a pressure spring 63 which tends to urge the saucer from the position shown in FIG. 5 to the position represented in FIG. 6. This displacement is in the first instance impeded due to the cooperation of the pin 47 with the cam surface 49. The pin 47 which in this case acts as a locking element of the coupling 13, is supported in a flat or slightly hollowed seat 64 of the cam surface 49 (see FIGURE 8 and 7 resp.). The ring 50 in which this cam surface 49 is machined twice acts in this case as a supporting element for the locking element 47 constructed as a pin. When torque is exerted on the shaft 45, so that this shaft turns and the pin is removed from its seat 64, the pressure of the spring 63 can move the shaft 45 in axial direction until the pin 47 is in the lower part 65 of the cam surface 49. At the same time the saucer 56 with the ring 57 is displaced whereby the claws 59 and 62 disengage from each other, while the claws 58 and 60 still remain partially engaged. This position is represented in FIGURE 6, whereby the coupling 13 is disconnected and the driving force imparted by the branch shaft 4 is no longer transmitted from the sprocket wheel 9 to the shaft 10.

The rotation of the locking element from the position represented in FIG. 5 is obtained through an impulse issuing from the first impulse sending element 30. When a predetermined acceptable driving couple is exceeded the rod 35 will in a way described hereinbefore be moved in a longitudinal direction and the head 42 will turn the arm 43 through a small angle. The shaft 45, too, will be turned through a small angle by way of the hub 44, whereby the pin 47 will be removed from its seat 64 so that this locking element loses hold of its support whereby the spring 63 can displace the saucer in axial direction until the pin 47 has arrived in the lower portion 65 of the cam surface 49. The coupling 13 is thereby disconnected.

The disconnecting force can be enhanced by the application of helically bent claws in one of both sets of cooperating claws. As is visible in FIG. 6 the row 62 is constructed so as to be slightly helical, this being the same with the row 59. In order to switch the coupling on again the shaft 45 is to be turned back, the pin 47 moving along the profile of the cam surface 49 while overcoming both the tension of the spring 63 and the axial pressure component proceeding from the helical claws 59 and 62. Due to this axial pressure component this re-engaging can only be effected with an unloaded machine, that is after the elimination of the source of overload, if any.

When owing to an unknown cause one or more of the digging blades 19 would be blocked whereby their tilting over movement would become impossible there is produced an overload of the mechanism within the housing 18. Normally only a very small part of the total driving force will through the tilting mechanism cause the tilting over of the digging blades. In the event of blocking the reaction force on the cam profile 25 may increase to a multiple of the normal value.

It may last some time before the overload has propagated by way of the hollow shaft 17, the gear wheels 15, 14 and the shaft 10 to the chain drive 6, whereupon the first impulse sender 30 can switch off the coupling 13. In order to obtain a very quickly responding overload protection on this side of the driving gear an impulse is derived from the central shaft 16, which shaft during the operation of the agricultural implement is blocked against rotation. This second impulse sending element will now be further described with reference to the FIGURES 3 and 4.

The central shaft 16 on its end situated in the proximity of the gearing 14, 15 is provided with a disc 70, which is secured on the said shaft. Provided along a small part of the circumference of this disc is a toothed segment 71, which is capable of cooperation with a rack element 72, provided on a connecting rod 73, constituting the second impulse sender. This rod is on its one end supported by a bracket 74 so as to be slidable and protrudes on its other end by a portion of smaller diameter in a bore of a seat 75. The rod 73 has the same function as the rod 35. The rod 73 has a tubular middle part 76 with internal screw thread engaging two threaded extreme parts, one part thereof carrying two nuts 77. Disposed around a part of the rod 73 is a helical spring 78, which by its one end is bearing against the bracket 74 and by its other end is bearing against a pressure piece 79, which is bearing on the nuts 77. At its free end the rod 73 has a head 80 which is capable of cooperation with an arm 81, mounted on a socket 82, which is supported so as to be capable of turning and which is provided with a second arm 83 in a plane perpendicular to the plane of the arm 81. The arm 83 can cooperate with an arm 84 mounted on a hub 44 of the shaft 45.

In the Horowitz Patent 3,012,616, particularly FIG. 12, is shown a roller and connected rack and pinion mechanism which all revolve about a shaft such as 23 of the present application guided by movement of the roller in cam 25 to tilt the blades 19. When for some reason or other the tilting over movement of a digging blade 19 is blocked there will be produced an overload in the tilting mechanism, no tilting can take place, which means that the roller (not shown) upon the continuation of its revolving movement around the cam profile, will not be able to move sidewardly and thus exercises a strong reaction upon the cam profile so that this profile with the shaft 23 will slightly be turned, thereby correspondingly rotating the sector 70. This rotational couple will be directly transferred to the toothed segment 71 and the rack element 72 cooperating therewith. As soon as a value predetermined by putting the spring 78 under compression is exceeded this overload couple will cause a movement in axial direction of the rod 73 and a turn of the socket 82 through the head 80 and the arm 81. The shaft 45 is turned through a small angle through the arms 83 and 84, whereby the pin 47 is removed from its seat 64 and the pressure of the spring 63 effects the displacement of the saucer 56 so that the claws 59 and 62 disengage and the drive of the machine is interrupted. The thin end of the rod 73 can leave the bore of the seat 75 and assume a position as depicted in FIGURE 4. The rack element 72 thereby loses hold of the toothed segment 71, which means that the disc 70 with the central shaft 16 connected therewith can still perform a certain rotation. This rotation can be caused owing to the tractor 1 running out whereby the digging elements 19, which are entirely or partially in the soil, still cause a rotation of the blocked tilting mechanism. Due to the immediate release of the central shaft 16 the tilting mechanism inside of the housing 18 is perfectly protected against deformation or rupture owing to a possible exterior cause of blocking. Moreover the drive of the digging implement 2 is interrupted, so that the driver of the tractor has the opportunity to restore the cooperation between the toothed segment 71 and the rack element 72, whereby automatically the correct relative angular position of the rings 24 with their cam profile 25 in respect of the further part of the tilting mechanism inside the housings 18 is restored. Only thereafter the driving mechanism can be restored by turning back the shaft 45 to thereby re-engage the coupling 13. It is observed that in the disconnected position, shown in FIG. 4, the thin end of the rod 73 cooperates with a broadened portion of the seat 75, so that the rack element 72 cannot leave the periphery of the disc 70.

In order to adjust the position of the tilting range of the digging elements 19 one may use the cooperation between the toothed segment 71 and the rack element 72. The latter is slidably disposed on the rod 73. The position of the rack element 72 on the rod 73 can be fixed by means of some safety nuts disposed on either side of the rack element, the said nuts cooperating with the screw thread 76 provided on the part concerned of the rod 73.

The overload protection according to the invention is advantageous in the way that the disconnecting force of the coupling which has to interrupt the drive is independent of the value of the maximally acceptable torque in the driving mechanism. The value of this torque is adjusted by more or less tensioning the spring 40. The rather small effort which the rods 35 and 73 serving as impulse senders have to exert for disconnecting the coupling 13 is entirely independent of this value. The tension of the spring 78 defines the degree of the acceptable overload in the tilting mechanism. As the force for the tilting movement is only a fraction of the force for the digging operation the compression of the spring 78 will be inferior to that of the spring 40.

The invention provides a construction which on the one hand responds in a very sensitive way to any possibly appearing overload, but on the other hand can stand the rather rough treatment to which agricultural implements are exposed in general. The mechanism is also rather invulnerable for dirtying since in this respect the most vulnerable parts are accommodated in the casing 20 and the cover 37, respectively.

Although my invention has been disclosed in connection with a few preferred embodiments thereof, variations and modifications may be resorted to by those skilled in the art without departing from the principles of my invention, as disclosed in the foregoing description and defined by the appended claims:

I claim:

1. A digging implement for attachment to a tractor or like power source comprising a number of rotatable digging elements disposed in an annular configuration around a common axis of rotation, means for tilting said digging elements with respect to their planes of rotation as they rotate, a driving mechanism including clutch means connected to said digging elements for driving same and operating said tilting means, a first impulse sending means connected to said clutch means and to said driving mechanism and operative to disconnect said clutch means upon receipt of an overload force in said driving mechanism, and a second impulse sending means operable to receive overload forces from said tilting means and operatively connected to said clutch means to disconnect the clutch means upon receipt of an overload force encountered during tilting of said digging elements.

2. A digging implement according to claim 1 wherein said clutch means comprises a device displaceable between two end positions respectively connecting and disconnecting said clutch means and including a slidable member connected with a locking element, a supporting element mounting said locking element, said first and second impulse sending means being connected to at least one of said elements to impart thereto an unlocking and clutch means disconnecting movement with respect to the other element upon receipt of an overload force by either of the first and second impulse sending means.

3. A digging implement according to claim 2 wherein said displaceable device of the clutch means includes a ring with an inner and outer row of claws which are capable of cooperation with two complementary rows of coupling claws disposed on two concentric intermediate elements, the ring being carried by a saucer which is rotatably and slidably supported on a shaft concentric with both intermediate elements, said saucer being under the pressure of a spring against said locking and supporting elements.

4. A digging implement according to claim 3 wherein said ring with inner and outer rows of claws has the inner row permanently engaging the complementary claws of one of said intermeidate elements which is secured to the driven part of the driving mechanism, the claws of the outer row of said ring being positioned helically to facilitate the disconnection of the clutch means under load, the claws of the outer row of said ring engage the complementary claws of the other intermediate element in said first end position of the device and its locking element and disengage complementary claws of the other intermediate element which is connected with the driving portion of the driving mechanism when the device and its locking element are in their second end position.

5. A digging implement according to claim 4 wherein the locking element is a pin, said supporting element having an annular cam surface engaged by the pin and defining a track situated between two end positions, said movement imparted by said first and second impulse sending means causing relative rotational displacement between the cam surface and the pin around a line concentric with both said intermediate elements.

6. A digging implement according to claim 1 wherein said first and second impulse sending means are each connected with said clutch means by a slidable and rotatable shaft carrying a locking pin and cooperating with a stationary supporting annular cam surface, said shaft having transversely projecting arms bearing against said first and second impulse sending means to receive overload forces therethrough.

7. A digging implement according to claim 6 wherein said driving mechanism comprises a transmission having an endless chain, and said first impulse sending means includes a roller engaging the driving run of the chain transmission.

8. A digging implement according to claim 7 wherein said first impulse sending means comprises a rod connected to said roller and engaging one of said arms mounted on the shaft of the locking pin, the said shaft being under the pressure of a spring which is overcome when there is produced an overload in the drive, in such a way, that the rod shifts and the arm with the shaft turns and the locking pin is moved out of a first end position.

9. A digging implement according to claim 7 wherein the first impulse sending means is connected to the driving mechanism on the driving side and the second impulse sending means is connected to said tilting means on the driven side of said clutch means.

10. A digging implement according to claim 6 wherein at least two arms are secured to the rotatably and slidably supported shaft of the locking pin to protrude in directions perpendicular to the shaft, each of the first and second impulse sending means engaging one of the arms, said shaft and connected arms being turnable by hand after disconnection of the clutch means for moving the locking pin to thereby re-engage the clutch means.

11. A digging implement according to claim 6 wherein said digging elements are rotatably supported on a hollow shaft, said tilting means including a central shaft coaxial with said hollow shaft, and cam profiles on said central shaft engaged by rollers connected to the digging elements, said central shaft having secured thereto a perpendicular projecting element, said second impulse sending means including a connecting rod adjustable in length and having a portion engaging said projecting element and a portion connected to the implement for blocking the said central shaft in a definite angular position, one end of said connecting rod bearing against one of said arms on the shaft carrying said locking pin.

12. A digging implement according to claim 11, wherein said projecting element on the central shaft is constructed as a toothed segment engaging a complementary rack element on said connecting rod, the other end of said connecting rod being slidably guided in a support in such a way that after a movement in longitudinal direction the rod quits the support and the rack element loses hold of the toothed segment.

13. A digging implement according to claim 12, wherein said toothed segment forms a part of a disc the outer circumference of which coincides with the crest circle of the toothed segment.

References Cited by the Examiner
UNITED STATES PATENTS

| 1,434,539 | 11/22 | Guzowski | 192—150 |
| 1,818,148 | 8/31 | Matson | 172—103 |
| 2,094,971 | 10/37 | Surdy | 192—150 |
| 2,442,731 | 6/48 | Paul | 172—125 XR |
| 2,568,785 | 9/51 | Bechler | 192—150 XR |
| 3,012,616 | 12/61 | Norowitz | 172—95 XR |

FOREIGN PATENTS 875,508    8/61    Great Britain.

ABRAHAM G. STONE, *Primary Examiner.*